United States Patent [19]
Van't Hof

[11] 3,803,848
[45] Apr. 16, 1974

[54] BOOM ARRANGEMENT FOR CONFINING OIL

[76] Inventor: Gustaaf Van't Hof, 10021 Lesterford Ave., Downey, Calif. 90240

[22] Filed: Oct. 12, 1971

[21] Appl. No.: 188,313

Related U.S. Application Data

[63] Continuation-in-part of Ser. No. 829,303, June 2, 1969, Pat. No. 3,611,728.

[52] U.S. Cl. .................................................. 61/1 F
[51] Int. Cl. ............................................... E02b 15/04
[58] Field of Search ......... 61/1 F; 210/DIG. 21, 242

[56] References Cited
UNITED STATES PATENTS

| | | | |
|---|---|---|---|
| 3,611,728 | 10/1971 | Van't Hof | 61/1 F |
| 3,499,291 | 3/1970 | Mikkelsen | 61/1 F |

Primary Examiner—Peter M. Caun
Attorney, Agent, or Firm—Christie, Parker & Hale

[57] ABSTRACT

A vertically floating wall having a generally arcuate plan for confining oil spills or the like in open water is described. Several such arcs may be joined to form a sinuous wall. A pair of walls may be connected to form a V to be towed across an oil spill. A plurality of such walls may be joined end to end to form a polygonal enclosure for oil. The wall is preferably made by a plurality of vertically extending bar-like members having a trapezoidal cross section arranged side by side with the non-parallel sides of the trapezoid in abutment to form a substantially liquid-tight wall. A series of the bars have their narrower sides facing in one direction to form an arc concave in that direction. An adjacent series of bars are similarly abutted to form an arc concave in the opposite direction and such series are successively alternated to form the sinusoidal plan. A prestressing cable extends through in the trapezoidal members along the length of the sinusoidal assembly for applying a force towards the concave side of each of the arcs to thereby form an elastically stable structure.

17 Claims, 5 Drawing Figures

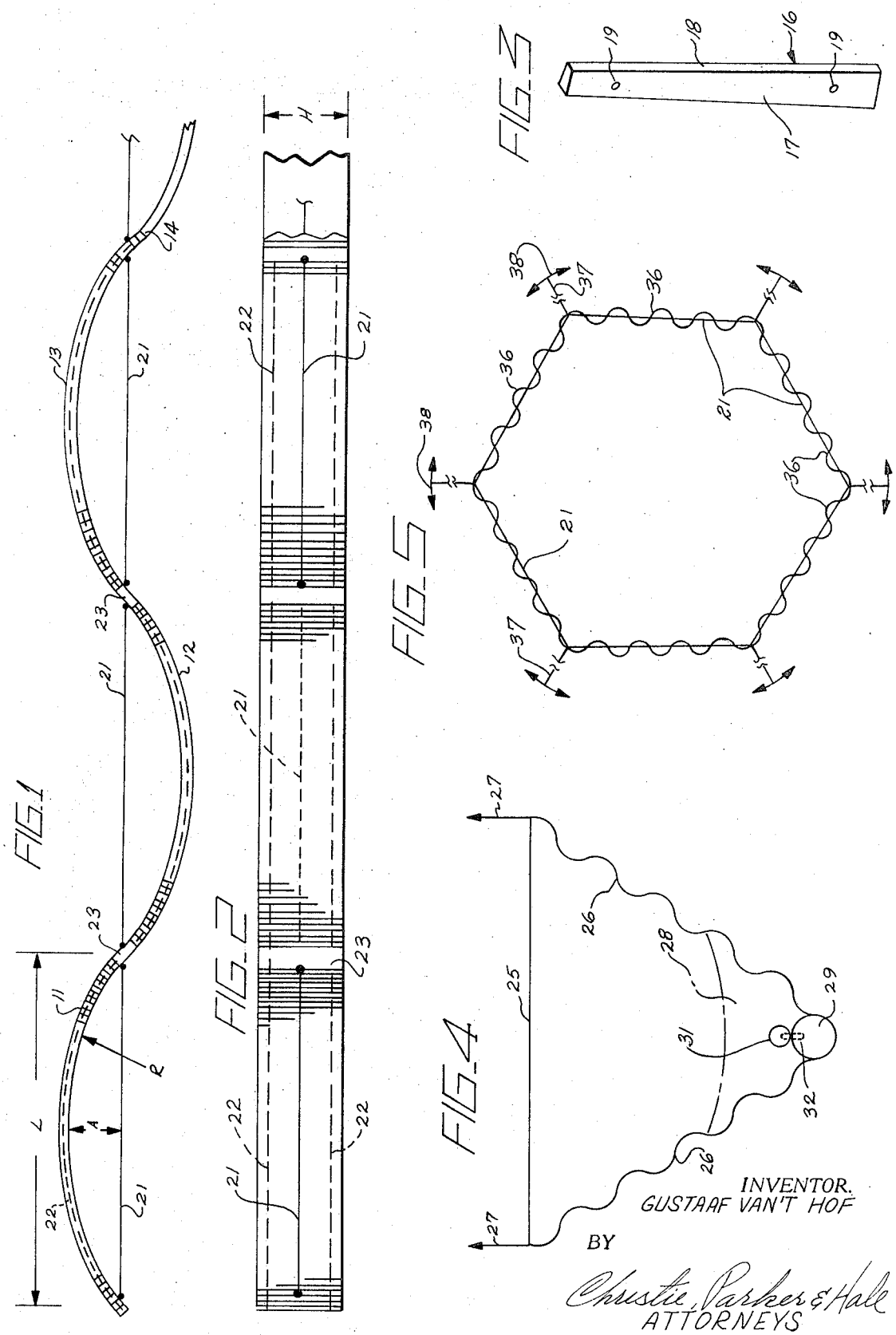

BOOM ARRANGEMENT FOR CONFINING OIL

BACKGROUND

This is a continuation in part of my copending U.S. Pat. Application Ser. No. 829,303 entitled "Structure for Confining and Storing Floating Liquid Products," now U.S. Pat. No. 3,611,728.

Over the last few years there have been a number of accidents wherein substantial quantities of oil have been spilled or otherwise discharged into the ocean or other bodies of water causing substantial pollution over large areas. Such oil spills may become quite extensive since the oil floats on the water and spreads as a relatively thin layer over a large area. A variety of techniques have been proposed and used for confining or collecting the oil floating on the water so that it can be removed. Floating booms of logs, foamed plastic blocks, or inflatable members have been devised for confining oil spills. Each of these has certain shortcomings of transportation, deployment, resistance to waive action, compatibility with water and oil, economy, or the like.

Since it is virtually impossible to identify the location of an oil spill in advance, it is important to provide a structure that can be easily, economically and rapidly positioned adjacent a spill to limit its extent, hopefully by surrounding the entire spill if not already too large. Preferably at least portions of the confinement means are also suitable for collecting and concentrating the oil so that it can be economically recovered from the water on which it is floating.

BRIEF SUMMARY OF THE INVENTION

Therefore in practice of this invention according to a presently preferred embodiment there is provided a floating structure for confining a first liquid which floats on the surface of a second liquid comprising a plurality of buoyant, bar-like members elongated in a vertical direction and interconnected in side by side abutment in an elongated wall having a generally arcuate plan. Several arcs may be connected to form a sinusoidal wall. The individual bar-like members preferably have a trapezoidal cross-section having non-parallel sides abutting in sets to form a series of arcs alternately concave towards opposite sides of the wall. A prestressing cable extending along the generally sinusoidal assembly of bar-like members provides rigidity, and means are provided for holding the members in abutment. A plurality of such floating walls can be interconnected for surrounding, confining or sweeping a spill of oil or the like. Alternatively, an arcuate wall can be formed by interconnecting curved segments all facing in the same direction.

DRAWINGS

These and other features and advantages of this invention will be appreciated if the same becomes better understood by reference to the following detailed description of a presently preferred embodiment when considered in connection with the accompanying drawings wherein:

FIG. 1 illustrates in plan view a portion of sinusoidal floating wall constructed according to principles of this invention;

FIG. 2 is a side view of the wall of FIG. 1;

FIG. 3 illustrates in perspective one bar-like member of a plurality of bar-like members forming the wall of FIGS. 1 and 2;

FIG. 4 illustrates in plan view a pair of sinusoidal walls interconnected in V-form for sweeping an oil spill or the like; and FIG. 5 illustrates in plan view a polygonal enclosure formed of floating sinusoidal walls constructed according to principles of this invention.

DESCRIPTION

FIGS. 1 and 2 illustrate in plan and elevation views respectively, a portion of a vertically floating wall constructed according to a presently preferred embodiment of this invention. The wall is an elongated structure preferably formed of wood, a concrete and foamed plastic combination, or plastic having a specific gravity appreciably less than one, so as to be buoyant. Hollow members can also be used. As best seen in the plan view of FIG. 1, the wall has a generally sinusoidal shape having a first arc 11 facing in one direction, a second arc 12 facing in the opposite direction, a third arc 13 facing in the same direction as the first arc 11, a fourth arc 14 facing in the same direction as the second arc 12 and so on, alternately, for whatever length may be desired. Typically, one unit or section of such a wall may comprise four such alternate arcs, each with a length L of about 20 feet for a total length in that wall section of 80 feet. For some applications, a single arc is adequate and it can be significantly longer than the mentioned 20 feet. Of course, more than four arcs can be interconnected to form a longer wall.

The wall is formed of a plurality of vertically extending buoyant members 16 such as illustrated in perspective in FIG. 3. Each bar 16 has a substantially trapezoidal cross section having a pair of non-parallel side faces 17, each of which is seen in FIG. 3, and a pair of parallel faces of dissimilar widths, the narrower one 18 of which is seen in FIG. 3. A pair of holes 19 extend through the trapezoidal bar 16 between the non-parallel faces 17. The angle between the non-parallel faces is exaggerated for purposes of illustration and more typically is only a very few degrees.

In the assembly illustrated in FIGS. 1 and 2 the elongated bars 16 are arranged vertically with their non-parallel faces in side by side abutment so as to collectively form a substantially liquid-tight wall. Within the first arc 11 the narrower faces 18 of the bar are all arranged facing in one direction so that collectively that set of bars forms an arc concave on that side. Within the second arc 12, the narrow faces of the bars all face in the opposite direction so that this second set form an arc concave on the opposite side.

Preferably the bars 16 are substantially identical for economy of manufacture and assembly and therefore the arc 11 is actually a segment of a circle. Thus, collectively the several arcs 11, 12, 13, etc. are of only generally sinusoidal shape being in the form of a series of oppositely facing alternating circular arcs rather than a true sine wave. The non-parallel faces 17 of the individual bars each lie on a radius of the arc. In a typical embodiment this radius R may have a length of about 17-½ feet and the total arc length subtends an angle of about 70°. In such an embodiment the amplitude A of the arc, namely the distance from a chord to the point of greatest departure of the arc is about 3 feet.

A pair of prestressing cables 22 extend along the full length of the floating wall. Each of the prestressing cables 22 is threaded through adjacent holes 19 in the successive bars 16 forming a wall. Tension in the prestressing cables 22 thereby applies a force towards the concave side of each of the arcs thereby pulling the bar-like members into tight, side-by-side engagement. The trapezoidal bars each act as a keystone that cannot move towards the concave side of the arc because of interaction with the adjacent bar. The bars cannot move toward the convex side of the arc because of the prestressing cables 22. At least one prestressing cable is needed to apply the preload keeping the bars in liquid tight abutment and means are also needed to keep the bars parallel to each other and provide a stable structure. Preferably this is accomplished with the second prestressing cable, but tongue and groove arrangements, pins or other interference devices can also be used to keep the bars parallel to each other. Tight frictional engagement alone may be sufficient to some embodiments to serve as the means to keep the bars parallel to each other.

A tie cable 21 extends as a chord across each of the arcs and is connected to the arc at each end thereof.

In the illustrated embodiment a plate 23 is provided between the adjacent arcs 11 and 12, 12 and 13, etc. The tie cable 21 for each of the arcs is connected to the plate 23 which provides a transition between the adjacent circular arcs. If desired in lieu of a plate between adjacent arcs to which the tie cables are connected, a single tie cable along the length of the wall can be employed and passed through a hole through the wall at the transition between adjacent arcs. It will also be recognized that if desired a plurality of tie cables 21 can be employed rather than the single cable illustrated. Typically the tie cable is relatively taut to keep the wall rather straight, but a slack tie cable can provide greater elasticity in the wall. The structure is stable without a tie cable and it can be omitted when transverse forces are not unduly large.

If desired, a larger number of prestressing cables 22 can also be employed. The prestressing cables 22 can also be supplemented by prestressing cables extending around the convex side of the arcs for augmenting the force towards the concave side. Such additional tensioning cables can be placed in grooves (not shown) on the longer parallel face of the trapezoidal members or can be held in place by eyes or staples connected to the bars.

The individual bars 16 are made of a buoyant material such as wood, plastic or very light weight concrete so that the wall floats with its upper edge well above the water surface and its lower edge well below the water surface so that any oil floating on the water is prevented from flowing through, under or over the wall. In order for the wall to float stably in a vertical orientation the metacenter must be above the center of gravity. Stability is enhanced when the amplitude A of each of the arcs is greater than about one-half the height H of the wall. Thus, for example, in a typical wall wherein the amplitude of each arc is 3 feet the height of the wall may be 5 feet. A larger amplitude to height ratio results in greater stability.

It will be noted that in lieu of a large number of narrow trapezoidal bars assembled together into an arc, a fewer number of longer arcuate sections can be assembled to form an arcuate floating wall. One could form long arcuate wall segments, each substantially a full arc, if desired, and these can be interconnected end to end with concave sides facing in opposite directions to form a sinuous wall. Several such arcs can be assembled into a longer arc, say a semi-circular or less, for confining an oil spill from one side. Such an arc can be towed to act as a sweep. The arcs can, of course, be non-circular. Another alternative is to use partly rectangular bar-like members and partly trapezoidal members in assembling an arc. Rectangular bars and shims on the convex side would also be suitable but generally less convenient. When a taut tie cable is used across the arc rectangular bars of deformable material can be used and the combination of prestressing cables and tie cables stressed to a level sufficient to deform the bars into an effective trapezoidal shape. If desired arcuate segments and straight segments of wall can be alternated to form a wall having a zig-zag plan with rounded "points."

FIG. 4 illustrates in plan view an application of vertically floating sinusoidal walls provided in practice of this invention. A pair of sinusoidal walls 26 are interconnected at adjacent ends in a general V shape. Cables 27 connected to the tips of the V extend to a pair of boats (now shown) which serve to tow the entire assembly formed by the two walls across the water. A cable 25 or plurality of cables across the V holds the angle of the V substantially constant. It will be apparent that if desired additional cables intermediate the ends of the V shaped sweep can be provided in any desired harness arrangement for distributing the towing load on the vertically extending walls 26.

This V shaped enclosure thereby sweeps any oil floating on the water within its path and induces it to float toward the apex of the V. Thus as it is used, oil 28 may accumulate near the apex of the V. A circular reservoir 29 is provided at the apex of the V. The reservoir is preferably a circular enclosure open at both the top and bottom as provided in my aforementioned copending application.

A skimmer 31 of any conventional form is provided within the apex of the V formed by the sinusoidal walls 26. A conventional pump means and conduit 32 skims oil and some water from within the apex of the V and transfers it to the region within the reservoir 29. Preferably the pump means 32 is an airlift or the like to facilitate installation and operation and to minimize agitation and comingling of the water and oil. This serves to suck oil down from the skimmer to the air lift and thence up into the reservoir. Little energy is needed to operate such a pumping means. Since the reservoir 29 is open at its top and bottom the depth of oil therein increases and merely displaces water from the bottom of the reservoir as the depth of oil increases. Thus, the depth of oil in the reservoir 29 may be substantially greater than within the apex of the V and such oil is readily removed to barges, tankers or the like at convenient intervals. If desired, oil can be skimmed from the reservoir to a second smaller and deeper one (not shown) for further increasing the depth of oil therein. The depth of oil in the center of the skimmer can be increased by discharging oil into it tangentially or otherwise maintaining a swirling motion. Oil can also be admitted to the reservoir by way of a floating weir.

Since the oil may be deeper near the apex than near the tips of the V it may be desirable to make the walls higher near the apex than nearer their opposite ends.

This is simply done by using bars of gradually increasing length so that the wall has a generally trapezoidal shape with smaller height at one end and greater height at the other. The prestressing cables are preferably maintained parallel for ease of assembly.

FIG. 5 illustrates in plan view a plurality of generally sinusoidal walls constructed according to principles of this invention interconnected to form a polygonal enclosure. Thus as illustrated in this embodiment six sinusoidal walls 36 are connected together at their ends to form a generally hexagonal enclosure. Cables 37 at the apexes of the hexagonal enclosure extend outwardly therefrom to conventional anchors 38 or the like which serve to maintain the enclosure in a substantially fixed position. The anchor cables are preferably connected to tie cables of the wall so that the stresses run along straight portions of the polygon. The anchoring load can enhance the prestressing and be differentially connected to the wall cables, such as for example, first connected to a tie cable by an elastic connection and thereafter when the elastic connection is fully stroked, connected to the prestressing cables. The anchor cable preferably is effectively connected about one-half the distance between the bottom and the water surface to best resist cross currents. In the illustrated embodiment, each apex of the polygon is, in effect an obtuse V shaped pair of walls as provided in the embodiment of FIG. 4. The apexes of the polygon can be more rounded if desired. It will be apparent that such an enclosure can be provided around an oil drilling platform or tanker operation (not shown) if desired or can surround any other actual or potential oil source for minimizing the area subject to contamination. Since the vertically floating wall extends a substantial distance above and below the surface of the water, a large quantity of oil can be contained therewithin without substantial danger of displacement due to wave action. Additional wall segments can be used to make larger polygons. If desired, such a polygonal enclosure can be towed to move oil confined therein to another location.

The area circumscribed by the polygon can also be gradually reduced to concentrate any oil confined therein. Thus, the polygon can be opened and one end of the wall can be slowly pulled past another end to reduce the circumference and hence the enclosed area. Another arrangement pinches adjacent walls together commencing at one side and progressing towards the opposite side, thereby reducing the effective area within which the oil may float.

Although limited embodiments of floating wall constructed according to principles of this invention and only a few utilizations thereof have been set forth in detail, many modifications, variations and utilizations will be apparent to one skilled in the art. Thus, for example, a wall constructed according to principles of this invention may be anchored as a barricade across a river or the like to confine floating oil or debris. Similarly, a wall can be placed on land and is self-supporting, for use as a fence, partition dam, or other barricade. It is therefore to be understood that within the scope of the appended claims the invention may be practiced otherwise than as specifically described.

What is claimed is:

1. An elongated structure comprising:
   a plurality of elongated bars each having a trapezoidal cross-section in side-to-side abutment along their non-parallel faces, a first set of the bars having the narrower of their parallel faces facing in a first direction to form a first arc concave in the first direction and a second set of the bars having the narrower of their parallel faces facing in a second direction opposite to the first direction to form a second arc concave in the second direction, arcs of the first and second types successively alternating along the elongated structure to form a generally sinusoidal assembly;
   a prestressing cable extending along the length of the sinusoidal assembly for applying a force pulling the bars into tight abutment; and
   means for preventing displacement of each of the bars relative to the adjacent bar in the plane of their abutment.

2. An elongated structure as defined in claim 1 wherein the means for preventing displacement comprises a second prestressing cable extending along the length of the sinusoidal assembly and spaced apart from the first mentioned prestressing cable.

3. An elongated structure as defined in claim 2 wherein each of the bars further comprises a pair of spaced apart openings extending between the non-parallel faces and wherein the prestressing cables extending along the length of the assembly each pass through respective aligned openings through the bars.

4. An elongated structure as defined in claim 3 further comprising a tie cable extending as a chord across each of the arcs.

5. A structure as defined in claim 1 wherein the maximum distance between the chord and the arc is greater than one-half the length of the bars.

6. A flexible structure for confining a first liquid which floats upon the surface of a second liquid comprising:
   a plurality of buoyant members having a vertical dimension considerably greater than their width;
   a prestressing cable extending along the length of the structure;
   at least one opening associated with each member to operatively connect each of said members, with the cable passing through the opening;
   said cable joining said members in substantially liquid-tight vertical side-by-side relationship to form a continuous wall having a first end and a second end;
   means for prestressing the cable and bringing each of the members into substantially liquid-tight abutment with the adjacent member; and
   at least one tie cable to form an arc of buoyant members with the tie cable substantially along the chord of the arc.

7. An elongated structure as defined in claim 1 further comprising:
   a tie cable extending as a chord across each of the arcs.

8. An elongated floating structure for confining a first liquid which floats upon the surface of a second liquid comprising:
   a first buoyant arcuate wall concave in a first horizontal direction;
   a second buoyant arcuate wall concave in a second horizontal direction opposite to the first direction; and
   arcuate walls of the first and second types successively alternating along the elongated structure to form a generally sinusoidal wall like assembly; and wherein each arcuate wall comprises:

a plurality of buoyant bar like members having a vertical extent substantially greater than their width in side-to-side abutment; and a cable extending along the length of the arcuate wall for prestressing the members and holding them in liquid-tight abutment.

9. A floating structure for confining a first liquid which floats on the surface of a second liquid comprising:

a plurality of buoyant bar-like members elongated in a vertical direction;

a prestressing cable for joining the members in vertical side-by-side abutment to form a continuous wall having a generally sinusoidal plan with arcs alternately concave on opposite sides of the wall; and wherein the metacenter of the structure is above the center of gravity whereby the wall floats with one end of the bar-like members extending above the surface of the first liquid and the other end of the bar-like members extending below the surface of the second liquid.

10. A floating structure as defined in claim 9 further comprising:

a tie cable extending across each of the arcs.

11. A floating structure as defined in claim 9 wherein each of the bar-like members is substantially trapezoidal in horizontal cross-section.

12. A floating structure as defined in claim 11 wherein each bar-like member comprises a pair of vertically spaced apart holes between non-parallel faces of the trapezoidal cross-section; and wherein a pair of prestressing cables are threaded through respective holes in successive bar-like members and extend along substantially the full length of the sinusoidal assembly thereof.

13. A floating structure comprising:

a first structure as defined in claim 12;

a second structure as defined in claim 12; and means for interconnecting the first and second structures in a generally V-shaped plan.

14. A floating structure as defined in claim 13 wherein a plurality of V-shaped structures are interconnected end to end for forming a polygonal enclosure.

15. A floating structure as defined in claim 13 further comprising:

a reservoir open at its upper and lower ends at the apex of the V-shaped assembly; and means for skimming the first liquid from the surface of the second liquid within the V and transferring the first liquid into the reservoir.

16. A floating structure comprising a pair of floating structures as defined in claim 9 interconnected end to end for forming a V-shaped floating structure; and means for towing the V-shaped structure in a direction away from the apex of the V.

17. A polygonal floating structure comprising a plurality of floating structures as defined in claim 9 interconnected end to end for forming an enclosure; and means for fixing the enclosure in position while floating in the second liquid.

* * * * *